US009488753B2

(12) United States Patent
Bassett (10) Patent No.: US 9,488,753 B2
(45) Date of Patent: Nov. 8, 2016

(54) MARINE GEOPHYSICAL EQUIPMENT CLEANER

(71) Applicant: PGS Geophysical AS, Lysaker (NO)

(72) Inventor: Piran Francis Bassett, Sproatley (GB)

(73) Assignee: PGS Geophysical AS, Oslo (NO)

( * ) Notice: Subject to any disclaimer, the term of this patent is extended or adjusted under 35 U.S.C. 154(b) by 326 days.

(21) Appl. No.: 14/068,834

(22) Filed: Oct. 31, 2013

(65) Prior Publication Data

US 2014/0338699 A1 Nov. 20, 2014

Related U.S. Application Data

(60) Provisional application No. 61/824,218, filed on May 16, 2013.

(51) Int. Cl.
*B08B 9/00* (2006.01)
*G01V 13/00* (2006.01)

(52) U.S. Cl.
CPC ..................... *G01V 13/00* (2013.01)

(58) Field of Classification Search
None
See application file for complete search history.

(56) References Cited

U.S. PATENT DOCUMENTS

| 7,145,833 | B1 | 12/2006 | Hoogeveen |
| 7,409,919 | B2 | 8/2008 | Hoogeveen et al. |
| 8,267,031 | B2 | 9/2012 | Austad et al. |
| 8,514,664 | B2 | 8/2013 | Harrick et al. |
| 8,960,117 | B2 | 2/2015 | Nielsen et al. |
| 2006/0054186 | A1 * | 3/2006 | Lepage .................. B08B 1/008 134/6 |
| 2008/0135232 | A1 | 6/2008 | Lawler et al. |
| 2009/0217954 | A1 | 9/2009 | Hall |
| 2010/0278011 | A1 | 11/2010 | Harrick |
| 2011/0174207 | A1 | 7/2011 | Harrick et al. |
| 2012/0176858 | A1 | 7/2012 | Stenzel et al. |
| 2012/0176860 | A1 | 7/2012 | Stenzel et al. |
| 2012/0222709 | A1 | 9/2012 | Karlsen et al. |
| 2013/0098394 | A1 | 4/2013 | Fleischer-Pedersen |
| 2014/0083449 | A1 | 3/2014 | Erneland |

FOREIGN PATENT DOCUMENTS

| GB | 2411197 A | 8/2005 |
| GB | 2430142 A | 3/2007 |

OTHER PUBLICATIONS

United Kingdom Search Report mailed on Oct. 29, 2014, in the prosecution of patent application No. GB1408195.4, 3 pages.

* cited by examiner

*Primary Examiner* — Eric Golightly
(74) *Attorney, Agent, or Firm* — Meyertons, Hood, Kivlin, Kowert & Goetzel, P.C.

(57) ABSTRACT

Techniques are disclosed relating to an apparatus with scraping members for cleaning a geophysical equipment (e.g., a streamer) being towed behind a survey vessel. The apparatus may, in one embodiment, include a housing and a plurality of scraping members that are disposed at least partially outside of the housing. In another embodiment, when the geophysical equipment is being towed behind a survey vessel, portions of the geophysical equipment may be flattened or compressed due to the towing force exerted on the geophysical equipment, and the apparatus of this disclosure may still be used to clean the geophysical equipment. A method is disclosed related to operating an apparatus with a plurality of scraping members and removing debris from a geophysical equipment.

17 Claims, 4 Drawing Sheets

FIG. 6

MARINE GEOPHYSICAL EQUIPMENT CLEANER

CROSS-REFERENCE TO RELATED APPLICATIONS

This application claims the benefit of Provisional Patent Application No. 61/824,218 filed May 16, 2013, which is hereby incorporated by reference in its entirety.

BACKGROUND

This application generally relates to the field of marine geophysical prospecting. More specifically, the application relates to equipment and methods for geophysical prospecting. In particular, anti-debris equipment and methods are disclosed.

In the oil and gas exploration industry, marine geophysical prospecting is commonly used in the search for subterranean formations. Marine geophysical prospecting techniques yield knowledge of the subsurface structure of the Earth, which is useful for finding and extracting hydrocarbon deposits such as oil and natural gas. Seismic surveying and electromagnetic surveying are two of the well-known techniques of marine geophysical prospecting.

For example, in a seismic survey conducted in a marine environment (which may include saltwater, freshwater, and/or brackish water environments), one or more seismic energy sources are typically configured to be submerged and towed by a survey vessel. The survey vessel is typically also configured to tow one or more (typically a plurality of) laterally-spaced streamers through the water. Electromagnetic surveys may tow equipment, including streamers, in a similar fashion. Some techniques of geophysical prospecting involve the simultaneous use of seismic and electromagnetic survey equipment.

In a typical marine survey, the streamers on which the sensors are located are very long, typically multiple kilometers in length. Some surveys may be conducted with a single streamer, while some surveys utilize multiple streamer systems including one or more arrays of streamers. The exterior of towed equipment, such as streamers and related equipment, are subject to accumulation of debris (e.g., seaweed, marine organisms, barnacles, or algae). Such accumulations can increase drag on the equipment as it is towed through the water, making towing more difficult and expensive, and subjecting the equipment to malfunction or damage, as well as causing turbulence that may increase towing noise and degrade the quality of recorded signals.

Scrapers may be employed to remove debris from the exterior of marine survey equipment, such as streamers. A common type of scrapers is a metal scraper (e.g., barnacle scraper) that may be clamped around a streamer. Some scrapers may have a tendency to slide over the debris without removing it. Some scrapers may also have a tendency to be clogged by debris. As a result, the cleaning operation may need to be suspended to unclog the scraper. Inefficiency in the cleaning operation typically increases survey downtime and survey cost. Such cleaning operation can be difficult to perform, dangerous to personnel in the event of unexpected rough water, and, depending on the skill of the cleaning operator, may risk damage to the streamer.

Geophysical equipment including some streamers known in the art may include sensors, streamer positioning devices, birds, connectors, and various other devices along their lengths. Geophysical equipment may include, for example, streamer positioning devices (e.g., lateral force and depth control devices known as "birds") and sensors for acoustic detection. Moreover, streamers known in the art may have sections along their length with different diameters (either by design or as a result of towing effects). There exists a need for a marine geophysical equipment cleaning device that can traverse an entire deployed streamer, wherein the streamer has a varying diameter along the length, and/or the streamer includes such components as sensors, streamer positioning devices, birds, connectors, and other devices.

While at least a portion of the explanation of the need provided herein refers to seismic surveying, it is important to recognize that the survey system here is not limited to seismic survey but rather any survey system which includes a cable towed by a vessel including a survey vessel. Such other types of cables may include, without limitation, electrodes, magnetometers and temperature sensors. Accordingly, the references to seismic streamers are provided as non-limiting examples.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to", "usable to", or "operable to" perform a task or tasks. In such contexts, "configured to", "usable to" and "operable to" is each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to", "usable to", or "operable to" language include hardware—for example, circuits, memory storing program instructions executable to implement the operation, etc. Reciting that a device/unit/circuit/component is "configured to", "usable to", or "operable to" perform one or more tasks is expressly intended not to invoke 35 U.S.C. §112(f), for that device/unit/circuit/component.

Figure 1:
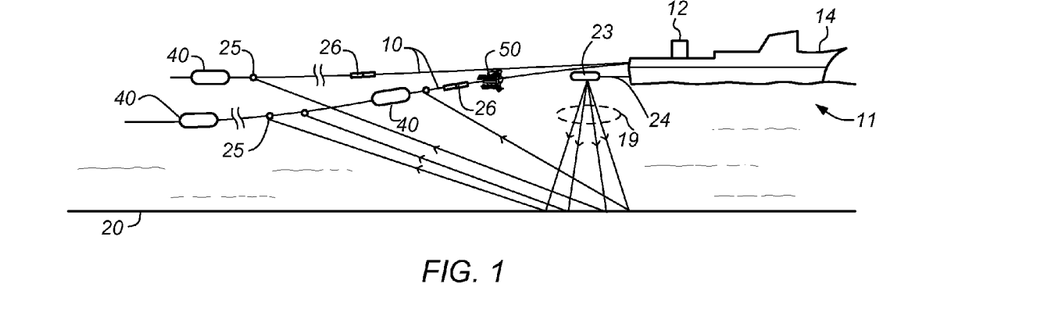
FIG. 1 depicts a survey vessel towing an array of streamers in a body of water with an apparatus attached around one of the streamers.

FIG. 1 shows an exemplary marine geophysical survey system as it is typically used in acquiring geophysical data for a survey. Survey vessel 14 may move along the surface of body of water 11, such as a lake or the ocean. The marine geophysical survey is intended to detect and record geophysical signals (e.g., seismic, electromagnetic, etc.) reflected and/or refracted from the Earth's subsurface. Survey vessel 14 includes source actuation, data recording and navigation equipment, shown generally at 12 and referred to for convenience as a "recording system." Survey vessel 14, or a different vessel (not shown), may be configured to tow, via source cable 24, one or more geophysical energy sources 23, or arrays of such sources (not shown) in body of water 11. Survey vessel 14 or the different vessel may tow an array of streamers 10 through water 11. In some embodiments, the array of streamers 10 may extend behind the survey vessel 14 or the different vessel for several kilometers or more. At least one of streamers 10 typically includes a plurality of sensors 25 and/or a plurality of streamer positioning devices 40. Sensors 25 may include hydrophones, geophones, electrodes, magnetometers or any other sensing device used to detect energy originating from geophysical energy source 23. At least one of streamers 10 may include a plurality of connectors 26 and/or other related equipment (e.g., sensors, streamer positioning devices, birds, not separately shown) along the lengths. In some embodiments, connectors 26 may be configured to connect or interconnect various sections and/or segments of streamer 10. In some cases, lead-in cables (not separately shown) are used at the front end of the towed streamer array to connect the array to the survey vessel 14. Lead-in cables may generally include multiplexed data transmission lines. Some lead-in cables may include electro-optic components.

During one embodiment of survey operation, relevant equipment (not shown separately) in recording system 12 causes geophysical energy source 23 to actuate at selected times. When actuated, geophysical energy source 23 may produce geophysical energy 19 that emanates generally outwardly from geophysical energy source 23. Geophysical energy 19 may travel downwardly, through water 11, and may pass, at least in part, through water bottom 20 into the formations (not separately shown). Geophysical energy 19 may be at least partially reflected or refracted from one or more impedance boundaries below water bottom 20, and may travel upwardly whereupon it may be detected by sensors 25. Structure of the formations, among other properties of the Earth's subsurface, may be inferred by travel time of geophysical energy 19 and by characteristics of the detected geophysical energy such as its amplitude and phase.

Streamer positioning devices 40 may impart forces to streamer 10 in selected directions. Such streamer positioning devices may include one or more rotatable control surfaces that, when moved to a selected rotary orientation with respect to the direction of movement through the water, create a hydrodynamic lift in a selected direction to urge streamer 10 in a selected direction. Such selected direction may be lateral (i.e., perpendicular to the towing direction) or vertical (i.e., depth) with respect to the array of streamer 10.

The quantity of streamers, sensors, streamer positioning devices, or connectors shown in FIG. 1 is only for purposes of illustration and is not a limitation on the number of each device that may be used in any particular embodiment. The broken lines in the array of streamers 10 indicate that this figure is not necessarily drawn to scale. As shown in FIG. 1, apparatus 50 may be attached around an exterior surface of one streamer 10. In other embodiments, apparatus 50 may be attached around source cable 24, the lead-in cables, or any other towed geophysical equipment that has a generally tubular structure.

Figure 2A:
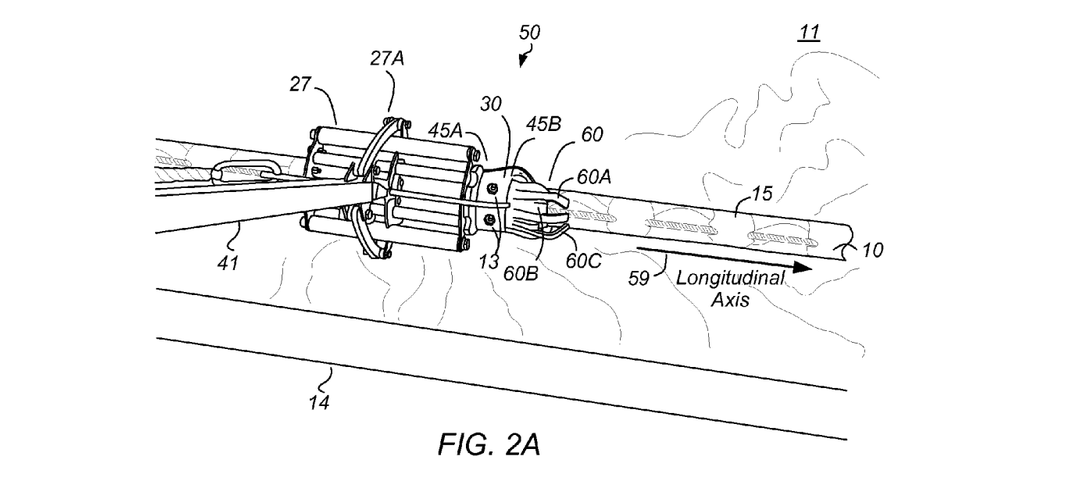
FIG. 2A depicts an embodiment of an apparatus attached to and around an exterior of a streamer.
Figure 2B:
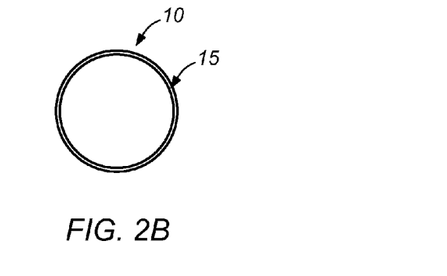
FIG. 2B depicts a cross-sectional view of a streamer.

FIG. 2A is an embodiment of apparatus 50 that may be attached around outer surface 15 of streamer 10. FIG. 2A is depicted from the perspective of survey vessel 14 from which apparatus 50 may be operated. As depicted, apparatus 50 may be operable from onboard survey vessel 14 (or, more typically, another vessel (not shown)) in body of water 11. Streamer 10 is a generally tubular structure, and a cross-sectional view of streamer 10 is shown in FIG. 2B. As shown in the cross-sectional view of FIG. 2B, streamer 10 has outer surface 15. FIG. 2A shows streamer 10 having longitudinal axis 59.

Apparatus 50 may include housing 30, having generally a cylindrical tubular structure in some embodiments. Housing 30 is configured to movably couple to and around outer surface 15 of streamer 10. Housing 30 may have an opening 45A at the proximal end of housing 30 and another opening 45B at the distal end. Streamer 10 may extend along longitudinal axis 59 through openings 45A and 45B. In this particular embodiment illustrated in FIG. 2A, opening 45A of housing 30 may be attached or otherwise secured to one end of scraper 27.

Scraper 27 may be a metal scraper generally usable during geophysical survey operations to remove debris from geophysical equipment. In the embodiment illustrated in FIG. 2A, scraper 27 may be in a closed configuration forming a generally tubular structure through which streamer 10 may extend along longitudinal axis 59. Scraper 27 may movably attached to and around outer surface 15 of streamer 10. In some embodiments, scraper 27 may be clamped around outer surface 15 of streamer 10. In certain embodiments, scraper 27 may include polyurethane scraper blades that are configured to remove debris from outer surface 15 of streamer 10 while remaining gentle to outer surface 15. In one particular embodiment, scraper 27 is made from stainless steel.

Scraper 27 may include handle (e.g., shaft) 41. One end of handle 41 may be attached to scraper 27 generally at a portion 27A of scraper 27. The other end of handle 41 may be onboard vessel 14 (or another vessel (not shown)). Handle 41 may be configured to control motion of scraper 27 along longitudinal axis 59 of streamer 10. Handle 41 may be operable to control motion of scraper 27 from onboard survey vessel 14 (or another vessel (not shown)). In some embodiments, scraper 27 may be pulled along longitudinal axis 59 of streamer 10 by way of handle 41. As scraper 27 is being pulled, scraper 27 may be moving or being displaced relative to streamer 10. As a result, debris along outer surface 15 of streamer 10 may be removed. In some embodiments, handle 41 may be manually operated by crew onboard survey vessel 14. In other embodiments, handle 41 may be operated by crew onboard of another vessel (not shown). In other embodiments, handle 41 may be mechanically or electrically operated.

As housing 30 may be attached to scraper 27 in this embodiment, handle 41 may control motion of both scraper 27 and housing 30. In one embodiment, control of handle 41 may cause scraper 27 to move or be displaced along streamer 10. As scraper 27 may be coupled to apparatus 50 by way of housing 30, apparatus 50 may in turn be moved or displaced. Other than scraper 27 and handle 41, any device that may connect to housing 30 and/or control motion of housing 30 along streamer 10 would be suitable.

Outer surface 15 may include a generally cylindrical structure which may have the same longitudinal axis 59 as streamer 10. Streamer 10 may extend through the tubular structure of housing 30 such that housing 30 may move along longitudinal axis 59 of streamer 10. Apparatus 50 may also include a plurality of scraping members 60. In this embodiment illustrated in FIG. 2A, scraping members 60 may be connected to housing 30 by fasteners 13.

In some embodiments, scraping members 60 may include individual scraping members 60A, 60B, and 60C (hereinafter "60A-60C"). Scraping members 60 may be configured to extend away from housing member 30 along longitudinal axis 59. In some embodiments, some or all of scraping members 60 may be generally finger-shaped. In other embodiments, scraping members 60 may be of a different shape such as a trapezoid shape and other shapes. Individual scraping members 60A-60C may have different shapes with one another. In the embodiment illustrated in FIG. 2A, individual scraping members 60A-60C may be of finger-shaped. In some embodiments, the distal ends of individual scraping members 60A-60C may have a generally flat edge. In other embodiments, scraping members 60 may have non-uniform shapes. In the embodiment shown, individual scraping members 60A and 60B have different lengths, though they may have similar or identical lengths in other embodiments.

Each of individual scraping members 60A-60C may include a separate proximal end that is configured to couple to housing 30 at opening 45B. In these embodiments, the proximal end of each of individual scraping members 60A-60C may be separately coupled to housing 30 at opening 45B. In some embodiments, scraping members 60 may include a proximal end common to (shared by) at least some of the individual scraping members. In one such embodiment, the common proximal end may be configured to attach to housing 30 at opening 45B. In such embodiments, individual scraping members may extend away from the common proximal end.

At least some of scraping members 60 such as individual scraping members 60A-60C may be flexible or bendable. In some embodiments, individual scraping members 60A-60C may each be configured to generally conform to at least a portion of a contour of surface 15 of streamer 10. In some of these embodiments, the contour of surface 15 of streamer 10 may be irregular at least at some locations on streamer 10. In one embodiment, scraping members 60 may form a generally tubular structure with an opening on each end. The tubular structure, particularly the portion toward the distal end of the tubular structure, may expand or contract as diameter of outer surface 15 may vary along the entire length of streamer 10. In some embodiments, scraping members 60 such as individual scraping members 60A-60C may, after expansion or contraction of the tubular structure, return to an unstressed state (not expanded or contracted state) and retain their original shapes prior to the expansion or contraction.

In this embodiment illustrated in FIG. 2A, as housing 30 may move along longitudinal axis 59, apparatus 50 that includes housing 30 attached to scraping members 60 may also move along the same axis. Distal ends of scraping members 60 may be configured to generally curve toward streamer 10 so that as apparatus 50 moves along longitudinal axis 59, scraping members 60 clean and/or scrape outer surface 15 of streamer 10.

In some embodiments, as apparatus 50 may move along longitudinal axis 59, scraping members 60 may clean streamer 10 by removing debris from outer surface 15. In one embodiment, one or more individual scraping member of scraping members 60 is a flexible, finger-shaped structure. In some embodiments, the flexible, finger-shaped structure is made from a thermoplastic material such as polyurethane. A proximal end of each of flexible, finger-shaped structures may be attached to housing 30. Each of the flexible, finger-shaped structures extends from the respective proximal end outwardly from housing 30, along the longitudinal axis 59. The respective distal end of each of the flexible, finger-shaped structures may be free-moving, and in some embodiments, may have a curvature toward outer surface 15. In one embodiment, the flexible, finger-shaped structures may form a generally tubular structure with an opening. Streamer 10 may extend through the opening. In this embodiment, the distal end of the tubular structure may be generally cooperatively engaged with and around outer surface 15 such that debris may be removed from outer surface 15 as the flexible, finger-shaped structures move and exert pressure around outer surface 15 along the length of streamer 10. The tubular structure, particularly the portion toward the distal end of the tubular structure, may expand or contract as diameter of outer surface 15 may vary. In some embodiments, the distal end of the tubular structure, when not coupled to any geophysical equipment, has a diameter smaller than the diameter of outer surface 15. In some embodiments, some of the flexible, finger-shaped structures may have different lengths.

In some embodiments, some of the flexible, finger-shaped structures may additionally include a portion on the distal end that is made of ceramic or another material (such as metal, alloy, and other generally rigid materials) that is different from the material of the flexible, finger-shaped structures. In these embodiments, the distal end made of ceramic or other materials may be configured to exert additional pressure to and around surface 15 of streamer 10 which may further increase efficiency of debris removal.

As discussed above, streamer 10 may include in various locations additional equipment such as sensors, streamer positioning devices, birds, connectors, and other equipment. As such, streamer 10 may not be uniform in diameter along the entire length. Some locations of streamer 10 may have diameters that are different than other locations. For example, at a location where streamer 10 includes a streamer positioning device, the diameter of that particular location may be larger than a location without any additional equipment. Furthermore, as the streamer is towed, the towing force exerted on streamer 10 may cause certain parts of streamer 10 to compress and/or flatten. At locations where streamer 10 is compressed and/or flattened, the resulting diameters may be smaller than those unaffected portions of streamer 10. In some embodiments, the flattened or compressed section of streamer 10 may generally be of an oval shape, and at least one diameter of the flattened or compressed section may be smaller than that of the unaffected section of streamer 10.

As apparatus 50 may move from one location of streamer 10 to another location, where the two locations have different diameters, scraping members 60 may expand or contract in response to changes in diameter of these locations. As such, scraping members 60 may remain generally engaged with and around outer surface 15. In one embodiment, scraping members 60 may form a generally tubular structure around outer surface 15. The generally tubular structure may generally maintain contact with outer surface 15. Such structure may generally conform to and around outer surface 15. The generally tubular structure may exert pressure on and around outer surface 15 along the length of streamer 10 and remove debris from outer surface 15. Outer surface 15 may include at least one or more of the following along the length of streamer 10: a sensor, a streamer positioning device, a bird, and a connector.

Figure 3:
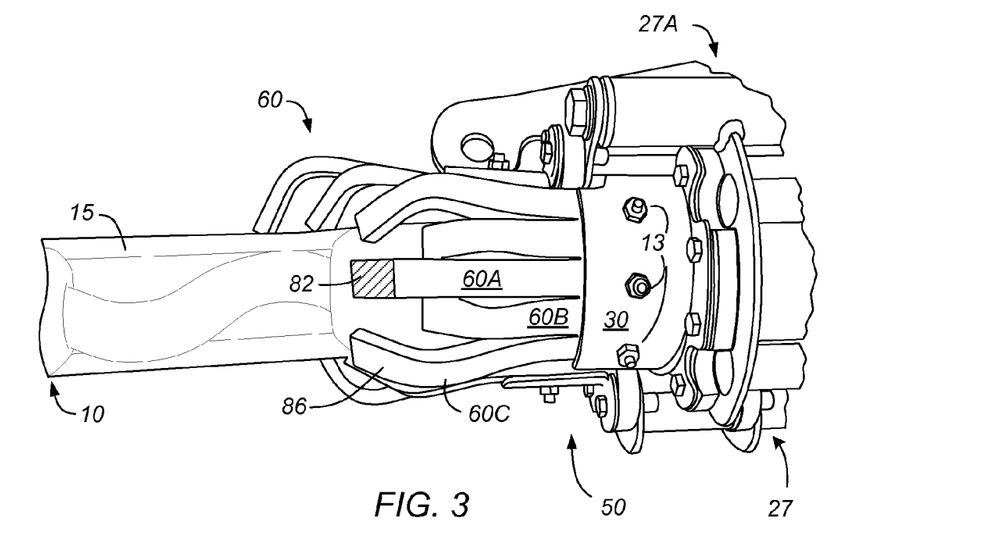
FIG. 3 depicts a close-up view of the embodiment shown in FIG. 2A.

Turing to FIG. 3 which is an embodiment of apparatus 50 attached to streamer 10. As discussed earlier, apparatus 50 may include scraping members 60 and housing 30. In the embodiment shown in FIG. 3, housing 30 may be attached to scraper 27 (the curved lines of scraper 27 indicate that the illustration shows a truncated scraper 27 and the remaining portions of scraper 27 are not shown). Portion 27A of scraper 27 generally indicates a portion of scraper 27 that may be attached to handle 41 (shown in FIG. 2A). Scraping members 60 may include a plurality of individual scraping members such as individual scraping members 60A-60C. In some embodiments, individual scraping member 60A may be made from a thermoplastic material. Such material may include a type of medium density, hard plastic material such as polyurethane and other similar materials. In one embodiment, a molded or extruded polymer may be used. Yet in other embodiments, scraping members 60 may include an internal skeleton whose exterior may be coated by a plastic or polymeric material. A variety of materials may be used for the construction of the internal skeleton such as a composite material, metal, alloys and others. The plastic or polymer coating may include a molded or extruded polymer or other similar materials.

One end, such as a proximal end, of individual scraping member 60A may be fixed within housing 30. In some other embodiments, scraping member 60A may share a common proximal end with other scraping members and the common proximal end may be configured to be fixed within housing 30. In the particular embodiment illustrated in FIG. 3, a proximal end scraping member 60A may be fixed within housing 30 by fasteners 13. The distal or scraping end of individual scraping member 60A, which is outside of housing 30, extends away from housing 30. Distal or scraping end of individual scraping member 60A may exert pressure on and around at least a portion of outer surface 15. Individual scraping member 60A may additionally include portion 82 on the distal or scraping end. Portion 82 may be made of a different material than that of scraping members 60. For example, portion 82 may be made of a ceramic material, a metal, an alloy, or other generally rigid material. In other embodiments, portion 82 may be removable and/or insertable relative to individual scraping member 60A.

In some embodiments, the distal or scraping end of individual scraping member 60A may curve toward and be engaged with and around outer surface 15. Individual scraping member 60A may be flexible and curved toward outer surface 15 such that the distal or scraping end generally conforms to and around outer surface 15. Furthermore, individual scraping member 60A may be configured so that the distal or scraping end exerts generally constant pressure on at least a portion of outer surface 15 along a length of streamer 10. In other embodiments, the pressure may vary in accordance with changes in outer surface 15, but still be sufficient to scrape effectively regardless of such variations. In some embodiments, outer surface 15 may additionally include, in locations along the length of streamer 10, one or more streamer positioning device (not separately shown).

In FIG. 3, scraping members 60 may also include individual scraping member 60B that neighbors individual scraping member 60A. In some embodiments, individual scraping member 60B may be identical in structure to scraping member 60A. Yet in some other embodiments, individual scraping member 60B may have a dimension other than that of scraping member 60A. For example, individual scraping member 60B may be shorter than scraping member 60A. Individual scraping member 60B may have a larger width than scraping member 60A. Individual scraping member 60B may have a different curvature than scraping member 60A. In some embodiments, portions of individual scraping members 60A and 60B partially or completely overlap. In these and other embodiments, individual scraping members 60A and 60B are together configured to scrape an area on outer surface 15.

In FIG. 3, scraping members 60 may also include individual scraping member 60C. Individual scraping member 60C may be identical to one of individual scraping members 60A and 60B. Individual scraping member 60C may have dimensions different than either individual scraping member 60A or 60B. Individual scraping member 60C may partially or completely overlap with one or more of the neighboring individual scraping members (not separately shown). As shown, distal or scraping end 86 of individual scraping member 60C may curve toward outer surface 15. Outer surface 15 may have irregular contours along the entire length of streamer 10. Distal or scraping end 86 of individual scraping member 60C may be configured to generally maintain contact with outer surface 15. Distal or scraping end 86 of the individual scraping member 60C may be similarly configured to exert pressure on outer surface 15 such that debris may be removed (i.e., scraped) from outer surface 15. Plurality of scraping members 60 may include additional individual scraping members (not separately identified in FIG. 3); these additional individual scraping members may have a similar dimension and/or configuration with any of scraping member 60A, 60B, or 60C.

Scraping members 60 may generally conform to and around outer surface 15 of streamer 10 when the diameter of streamer 10 is variable (e.g., not uniform) along the entire length. In some embodiments, scraping members 60 may expand when a diameter of streamer 10 increases from one section to another. For example, at a section of streamer 10 where streamer 10 includes a sensor, the diameter of streamer 10 at that section may be larger than another section of streamer 10 without the sensor. In that particular embodiment, scraping members 60 may expand such that scraping members 60 generally remain in contact with and exert pressure on and around outer surface 15 such that outer surface 15 is scraped by scraping members 60. In yet some other embodiments, a section (e.g., a segment) of streamer 10 may flatten or compress. In some cases, towing force exerted on streamer 10 may stretch streamer 10 in the towing direction and thus cause certain sections of streamer 10 to flatten or compress. In a flattened or compressed section of streamer 10, the diameter of that particular section may be smaller than a section of streamer 10 unaffected and/or unchanged by the towing force. In some embodiments, the flattened or compressed section may generally be of an oval shape, and at least one diameter of the flattened or compressed section may be smaller than that of the unaffected section. In these embodiments, scraping members 60 may contract in response to the decrease in diameter as the section of streamer flattens or compresses.

Figure 4:
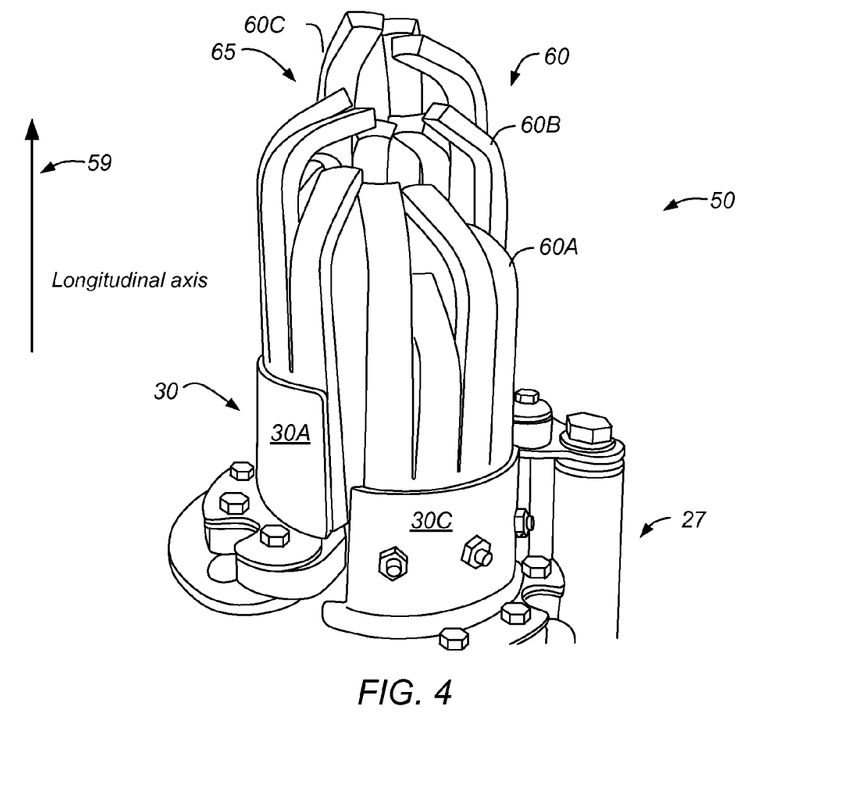
FIG. 4 depicts a side-view of an embodiment of a closed apparatus that is not attached to a streamer.
Figure 5:
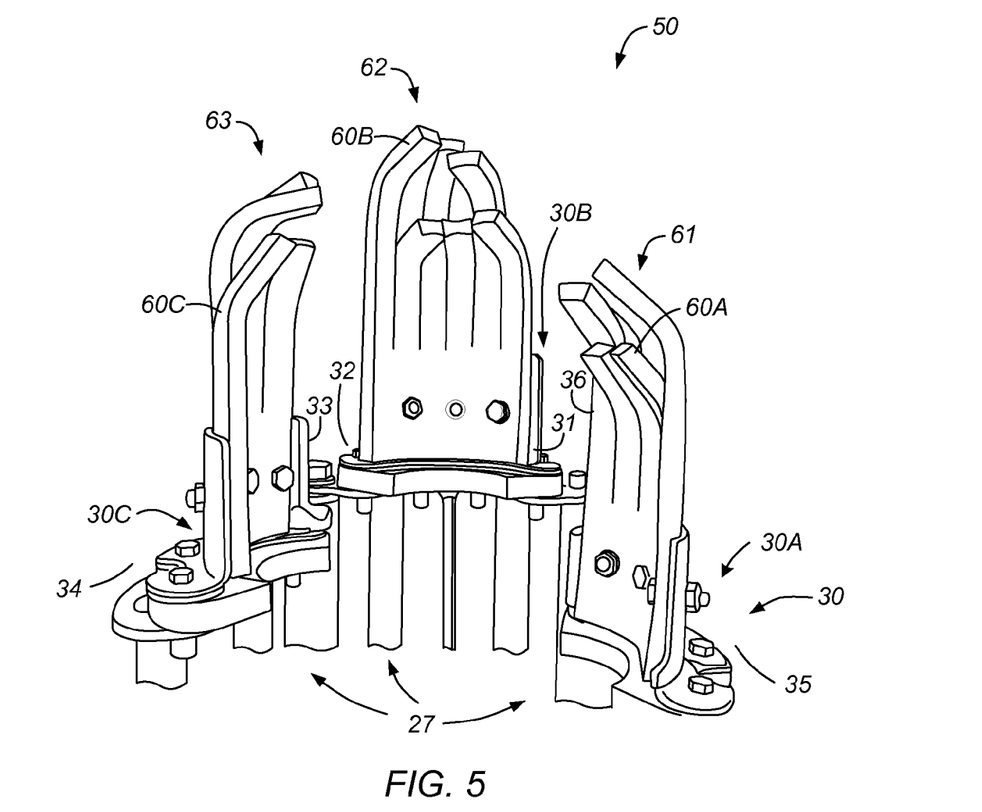
FIG. 5 depicts a side-view of an embodiment of an opened apparatus that is not attached to a streamer.

FIGS. 4 and 5 show a stand-alone apparatus 50 not attached to a streamer, wherein apparatus 50 is erected with housing 30 as a base. FIG. 4 depicts apparatus 50 in a closed configuration, wherein FIG. 5 depicts apparatus 50 in an open configuration. As shown in FIG. 5, housing 30 may include three separate portions, 30A, 30B, and 30C. In the open configuration shown in FIG. 5, a truncated depiction of scraper 27 is shown to be open showing three connected portions. Housing portions 30A, 30B, and 30C may each be configured to attach to respective scraping members 61, 62, and 63, each of which may further comprise various individual scraping members such as individual scraping members 60A, 60B, and 60C. In one embodiment, each of housing portions 30A, 30B, and 30C may include a plurality of sockets (e.g., 8), and each socket may be attached to an individual scraping member such as scraping member 60A, 60B, 60C, or others. In this particular embodiment, scraping members 60 would include a total of 24 individual scraping members. In this particular embodiment, each of scraping members 61, 62, and 63 would include 8 individual scraping members.

In other embodiments, some individual scraping members such as scraping member 60A, 60B, 60C, and/or others may share a common proximal end, and such common proximal end may be secured to one socket of 30A, 30B, or 30C. In this particular embodiment, instead of each individual scraping member being attached to an individual socket of housing portions 30A, 30B, and 30C, a common proximal end may be configured to attach to the corresponding socket or other relevant components of housing portions 30A, 30B, or 30C. Individual scraping members such as scraping member 60A, 60B, 60C, and/or others may extend from the common proximal end and along the length of streamer 10. In this particular embodiment, scraping members 61, 62, 63, and/or others would include the common proximal end from which individual scraping members extend.

In some embodiments, each of 61, 62, and 63 may include a plurality of individual scraping members such as scraping member 60A, 60B and 60C. In some embodiments, scraping members 61, 62, and 63 may contain the same quantity and configuration of identical individual scraping members. In other embodiments, at least two of scraping members 61, 62, and 63 may contain individual scraping members that differ in quantity, arrangement, and/or configuration. In yet other embodiments, some of scraping members 61, 62, and 63 may include a common proximal end configured to attach to housing portions 30A, 30B, or 30C, and individual scraping members extending from the common proximal end along streamer 10; whereas others may include individual scraping members that are configured to attach to sockets or other relevant components of housing portions 30A, 30B, or 30C.

In the embodiment of FIG. 5, side 32 of housing portion 30B may be movably connected to side 33 of housing portion 30C, whereas side 31 of 30B may be movably connected to side 36 of 30A. Side 34 of housing portion 30C may be configured to be connected to side 35 of housing portion 30A upon which housing 30 closes (three sides of scraper 27 likewise closes). Sides 31, 32, 33, 34, 35, and 36 of housing portions 30A, 30B, or 30C may be arranged in various configurations.

In the embodiment illustrated in FIG. 4, all sides of housing portions 30A, 30B, and 30C are connected with one another, and housing 30 or apparatus 50 closes (housing portion 30B is not shown in FIG. 4). FIG. 4 also shows a truncated scraper 27 in a closed configuration. In this depiction, housing 30 and scraping members 60 may form an opening or an annular space shown as 65 through which streamer 10 may extend along longitudinal axis 59. In one embodiment, the diameter of annular space 65 near the scraping or distal end of scraping members 60 is approximately 40 mm. In this embodiment, the diameter of annular space 65, when idle (not coupled to any geophysical equipment), is smaller than the diameter of streamer 10 (e.g., 10 cm or less). In this embodiment, when streamer 10 extends along longitudinal axis 59 through annular space 65 of apparatus 50, scraping members 60 may expand so that streamer 10 may extend through annular space 65. Scraping members 60 may expand and generally conform to the generally cylindrical structure of streamer 10. Scraping members 60 may exert pressure around the cylindrical structure and generally maintain contact with and around outer surface 15 of streamer 10.

In a particular embodiment, a streamer 10 may include two sections (segments), a first section of streamer 10 may include one or more of the following equipment: a streamer, a source cable, a lead-in cable, or any combination thereof. In certain embodiments, the first section of streamer 10 may include one or more of the following equipment: a sensor, a streamer positioning device, a bird, or a connector. The first section of streamer 10 may include debris on and around surface 15 such as algae and/or barnacles. Apparatus 50 may firstly move along longitudinal axis 59 at the first section of streamer 10. Handle 41 that is attached to scraper 27 (by way of housing 30 that may be attached to scraper 27) may be operable to move apparatus 50. As apparatus 50 moves along the first section of streamer 10, apparatus 50 including scraping members 60 may be operable to exert pressure (e.g., scrape) around scrape surface 15 of the first section of streamer 10. Apparatus 50 may remove debris from surface 15 of the first section of streamer 10 through the pressure exerted.

In some embodiments, apparatus 50 may subsequently be moved to a second section of streamer 10. Handle 41 may be operable to control the movement apparatus 50 from the first section to the second section. In this embodiment, the second section of streamer 10 may have a diameter smaller than that of the first section. As apparatus 50 may subsequently be moved to the second section, scraping members 60 including the curved distal or scraping ends contract such that scraping members 60 generally remain in contact with and around surface 15 of the second section of streamer 10. Contracted apparatus 50 including scraping members 60 may exert pressure around surface 15 of the second section of streamer 10. Although the second section of streamer 10 has a diameter smaller than that of the first section in this particular embodiment, the contracting of apparatus 50 including scraping members 60 allows scraping members 60 to generally engaged with and around surface 15 of the second section. As such, apparatus 50 including scraping members 60 may exert pressure around surface 15 of the section second and remove debris thereon. In these embodiments, apparatus 50 including scraping members 60 may expand or contract in response to varying diameters of streamer 10 through its length. Apparatus 50 may generally remain engaged with and around surface 15 of streamer 10 as apparatus 50 may be moved or displaced along the length of streamer 10.

Figure 5A:
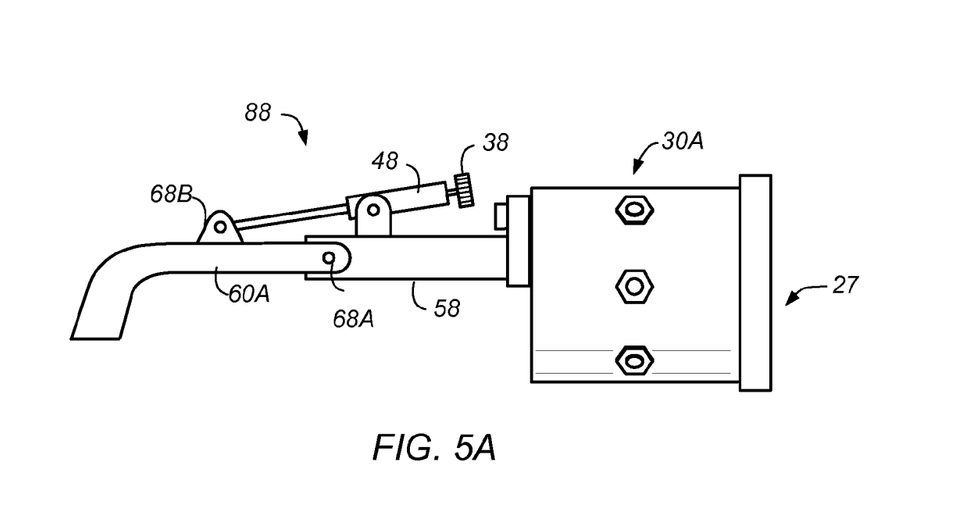
FIG. 5A depicts an alternative embodiment of the apparatus.

FIG. 5A shows an alternative embodiment of individual scraping member 60A. In this embodiment, one or more individual scraping member such as scraping member 60A may additionally include a spring assembly 88. Individual scraping member 60A may be attached to connecting apparatus 58 by hinge pivot 68A. Connecting apparatus 58 may be bolted to housing 30A or attached to housing 30A by other means. A truncated depiction of scraper 27 is shown and housing 30A may be connected to scraper 27 in this embodiment. Connecting apparatus 58 may be made of materials such as metal, alloy, composite material, or other generally rigid materials. Spring assembly 88 may include spring tension member 48 which may be connected to individual scraping member 60A via hinge pivot 68B. In this embodiment, pressure exerted by spring tension member 48 may be adjusted by adjusting screw 38. Individual scraping member 60A including spring assembly 88 may be configured to conform to a varying shape and/or diameter of streamer 10. In other alternative embodiments, instead of spring assembly 88, a hydraulic assembly, a pneumatic assembly, a servomotor assembly, a combination of such assemblies, or other similar assemblies may be attached to individual scraping member 60A and/or other individual scraping members. Yet in other embodiments, spring assembly 88 may additionally include a hydraulic component, a pneumatic component, a servomotor component, a combination of such components, or other similar components.

Figure 6:
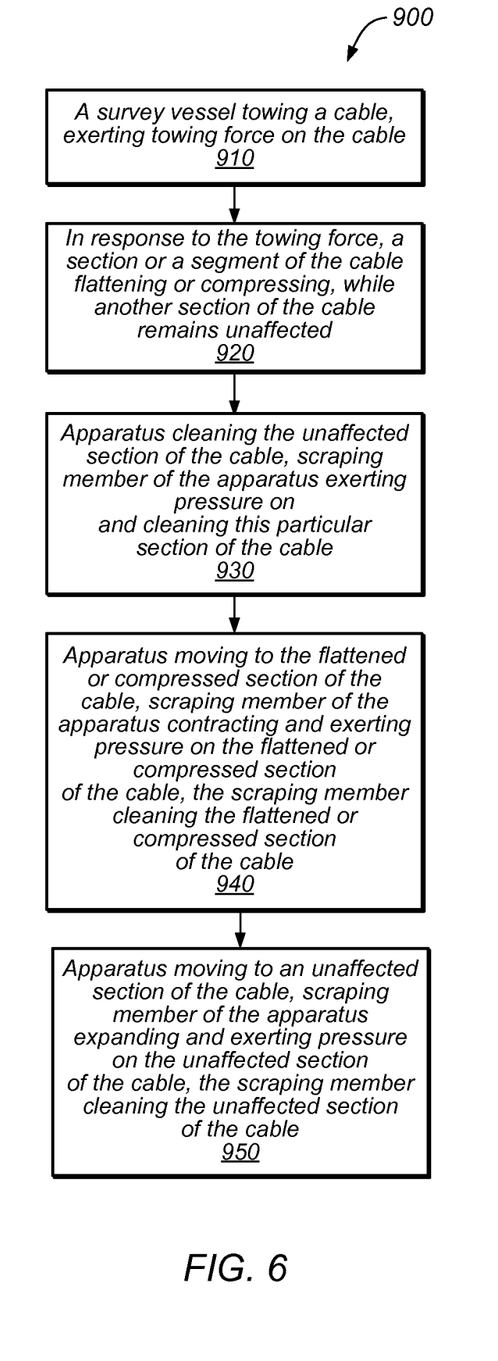
FIG. 6 is an embodiment of a process using the apparatus in a cleaning operation.

FIG. 6 is a flow diagram illustrating one exemplary embodiment of a method 900 for cleaning a geophysical equipment (e.g., a streamer) using apparatus 50. The method shown in FIG. 6 may be used in conjunction with any of the devices, elements, or components disclosed herein, among other devices. In various embodiments, some of the method elements shown may be performed concurrently, in a different order than shown, or may be omitted. Additional method elements may also be performed as desired. Flow begins at block 910.

At block 910, a survey vessel towing geophysical equipment such as a cable in a body of water, wherein a towing force is exerted on the cable. Flow proceeds to block 920.

At block 920, in response to the towing force, a section or a segment of the cable flattening or compressing, while another section of the cable remains unaffected. The flattened or compressed section may have a smaller diameter than that of the unaffected section. In some embodiments, the flattened or compressed section may generally be of an oval shape, and at least one diameter of the flattened or compressed section may be smaller than that of the unaffected section. Flow proceeds to block 930.

As block 930, at least one scraping member of an apparatus exerting pressure on the unaffected section of the cable. The apparatus may be attached around the cable and may have a movable housing and the at least one scraping member attached to the housing. The at least one scraping member exerting pressure on and cleaning this particular section of the cable. Flow proceeds to block 940.

At block 940, the apparatus moving to the flattened or compressed section of the cable. In some embodiments, the apparatus may be attached to a scraper (e.g., a metal scraper used in debris removal of geophysical equipment), and a handle attached to the scraper may control the motion of both the apparatus and the scraper. In these embodiments, one end of the handle may be onboard of a survey vessel or another vessel, and another end of the handle may be attached to the scraper. Crew onboard of the survey vessel or another vessel may control the motion of both the apparatus and the scraper by way of the handle. As the apparatus may be moving to the flattened or compressed section of the cable, the at least one scraping member contracting and exerting pressure on the flattened or compressed section of the cable. The at least one scraping member cleaning the flattened or compressed section of the cable. Flow proceeds to block 950.

At block 950, the apparatus moving to an unaffected section of the cable. This unaffected section may be the section discussed at block 930 or another section of the cable. This unaffected section of the cable may have a diameter larger than the flattened or compressed section. In response to the moving, the apparatus expanding and exerting pressure on the unaffected section of the cable. The at least one scraping member cleaning this particular section of the cable. Flow ends at block 950.

Towing geophysical equipment (such as streamers) and other equipment through the water may cause noise in the recorded data. Towing may cause vibrations in the geophysical equipment (such as streamers) due to turbulent flow past the surface of the geophysical equipment. The vibrations may lead to additional noise picked up by the sensors on the geophysical equipment. The vibration noise may affect pressure sensors such as the hydrophones and/or particle motion sensors such as the geophones. An apparatus in accordance with this disclosure may be used to reduce the drag due to turbulence on the geophysical equipment and other towed equipment thereby reducing the vibration noise, improving the quality of the survey results. Improvements of the quality of the survey results may aid in yielding information relating to the geologic structure and properties of the subterranean formations in the area being surveyed. Knowledge of the subsurface structure of the Earth may be useful for locating and extracting hydrocarbon deposits including oil and natural gas.

An apparatus in accordance with this disclosure may be used to improve the efficiency and safety of maintenance of geophysical equipment (such as streamers). The apparatus may also be used to reduce drag resistance in geophysical equipment during towing. Reduction in drag resistance may increase towing capacity including the capacity to tow more and longer streamers for surveying. Additional towing capacity may result in extended operational life, increased productivity and reduced operation cost. Further, reduced drag leads to reduced fuel costs for towing and results in savings in the overall operation cost of a survey.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A scraping apparatus comprising:
   a housing configured to move along a longitudinal axis of geophysical equipment; and
   a plurality of scraping members coupled to and disposed at least partially outside the housing, the plurality of scraping members including:
      a body portion that is at least partially disposed parallel to the longitudinal axis of the geophysical equipment; and
      a tip portion coupled to the body portion, the tip portion extending inward toward the longitudinal axis of the geophysical equipment;
   wherein the plurality of scraping members are configured to scrape at least a portion of the geophysical equipment in response to movement of the housing along the longitudinal axis of the geophysical equipment.

2. The apparatus of claim 1, wherein the geophysical equipment comprises at least one type of equipment selected from a group comprising: a streamer, a source cable, a lead-in cable, and any combination thereof.

3. The apparatus of claim 1, wherein the plurality of scraping members form an opening that is configured to receive the geophysical equipment, and wherein the opening is configured to at least partially expand around an outer surface of the geophysical equipment.

4. The apparatus of claim 3, wherein the opening has a diameter less than that of the geophysical equipment when the opening is not expanded around the outer surface of the geophysical equipment.

5. The apparatus of claim 1, wherein the plurality of scraping members are coupled to the housing such that at least two adjacent scraping members at least partially overlap.

6. The apparatus of claim 1, wherein at least one of the plurality of scraping members is made of a thermoplastic material.

7. The apparatus of claim 1, wherein at least one of the tip portions is made from a different material than the corresponding body portion.

8. The apparatus of claim 1, wherein at least two of the plurality of scraping members have different lengths.

9. The apparatus of claim 1, wherein the scraping members are configured to be at least partially curved toward the longitudinal axis of the geophysical equipment.

10. The apparatus of claim 1, further comprising:
a spring assembly coupled to at least one of the plurality of scraping members.

11. The apparatus of claim 1, further comprising the geophysical equipment.

12. The apparatus of claim 11, wherein the geophysical equipment includes a seismic streamer.

13. The apparatus of claim 12, wherein the geophysical equipment includes a plurality of devices positioned along a length of the geophysical equipment.

14. The apparatus of claim 13, wherein the plurality of devices include a streamer positioning device and a sensor.

15. The apparatus of claim 12, wherein the geophysical equipment has a varying diameter along its length.

16. A geophysical survey system comprising:
geophysical equipment;
a survey vessel configured to tow the geophysical equipment; and
a debris removal device coupled to the geophysical equipment, wherein the debris removal device includes:
a housing configured to move along a longitudinal axis of geophysical equipment; and
a plurality of scraping members coupled to and disposed at least partially outside the housing, the plurality of scraping members including respective body portions at least partially disposed parallel to the longitudinal axis of the geophysical equipment, and further including respective tip portions extending inward toward the longitudinal axis of the geophysical equipment;
wherein the plurality of scraping members are configured to scrape at least a portion of the geophysical equipment in response to movement of the housing along the longitudinal axis of the geophysical equipment.

17. The system of claim 16, wherein the geophysical equipment includes a seismic streamer that has a varying diameter along a length of the seismic streamer.

* * * * *